United States Patent

Coulter et al.

[11] Patent Number: 6,013,370
[45] Date of Patent: Jan. 11, 2000

[54] BRIGHT METAL FLAKE

[75] Inventors: Kent Coulter; Thomas Mayer; Roger W. Phillips, all of Santa Rosa, Calif.

[73] Assignee: Flex Products, Inc., Santa Rosa, Calif.

[21] Appl. No.: 09/005,064

[22] Filed: Jan. 9, 1998

[51] Int. Cl.[7] ............................... C09C 1/62; C09C 1/64
[52] U.S. Cl. .................... 428/403; 106/403; 106/404; 106/415; 106/437; 106/461; 106/482; 106/489; 106/286.5; 428/404; 428/426; 428/432; 428/433; 428/434; 428/446; 428/448; 428/450; 428/457; 428/469; 428/470; 428/471; 428/472; 428/328; 428/329; 428/332; 428/335; 428/336; 428/337
[58] Field of Search ....................... 106/403, 404, 106/415, 437, 461, 482, 489, 286.5; 428/403, 404, 426, 432, 433, 434, 446, 448, 450, 457, 469, 470, 471, 472, 328, 329, 332, 335, 336, 337

[56] References Cited

U.S. PATENT DOCUMENTS

| | | | |
|---|---|---|---|
| 3,123,490 | 3/1964 | Bolomey et al. | 106/415 |
| 3,622,473 | 11/1971 | Ohta et al. | 204/50 |
| 3,949,139 | 4/1976 | Dunning et al. | 428/328 |
| 3,962,397 | 6/1976 | Narui et al. | 264/144 |
| 3,988,494 | 10/1976 | McAdow | 428/328 |
| 4,116,710 | 9/1978 | Heikel | 106/404 |
| 4,213,886 | 7/1980 | Turner | 260/29.6 |
| 4,309,075 | 1/1982 | Apfel et al. | 350/164 |
| 4,321,087 | 3/1982 | Levine et al. | 75/356 |
| 4,552,593 | 11/1985 | Ostertag | 106/417 |
| 4,629,512 | 12/1986 | Kondis | 106/404 |
| 4,756,771 | 7/1988 | Brodalla et al. | 148/6.1 |
| 4,838,648 | 6/1989 | Phillips et al. | 350/166 |
| 4,978,394 | 12/1990 | Ostertag et al. | 106/404 |
| 5,135,812 | 8/1992 | Phillips et al. | 428/403 |
| 5,198,042 | 3/1993 | Masumoto et al. | 148/403 |
| 5,332,767 | 7/1994 | Reisser et al. | 523/209 |
| 5,593,773 | 1/1997 | McKay et al. | 428/328 |
| 5,763,086 | 6/1998 | Schmid et al. | 428/404 |
| 5,766,334 | 6/1998 | Hashizume et al. | 106/403 |
| 5,766,335 | 6/1998 | Bujard et al. | 106/404 |

FOREIGN PATENT DOCUMENTS

| | | |
|---|---|---|
| WO 96/22336 | 7/1996 | WIPO . |
| WO 96/38505 | 12/1996 | WIPO . |

OTHER PUBLICATIONS

Callister WD, Jr., *Materials Science and Engineering: An Introduction*, John Wiley & Sons, Inc., 91–112, 1985. [No month ].

Barrett et al., *The Principles of Engineering Materials*, Prentice–Hall, Inc., 282–290, 1973 [No month].

Greiwe K., *Coloured Aluminium Pigments*, Eckart–Werke Werk Güntersthal, 4th Nürnberg Congress, Paper 6, 1–7. [No date].

*Primary Examiner*—Anthony Green
*Attorney, Agent, or Firm*—Workman, Nydegger & Seeley

[57] ABSTRACT

A rigid and brittle bright metal flake is formed of a central layer of a reflective material supported on both sides by dielectric layers. In a preferred embodiment, the metal layer is aluminum having a thickness of about 100 nm and the dielectrics are either silicon dioxide or magnesium fluoride, each having a thickness of about 100 nm. The result is a very thin three-layered metal flake about 300 nm thick that exhibits a uniaxial compressive strength of about 8 times a corresponding uniaxial tensile strength. As a result, the metal flake is then afforded the benefits of rigidity and brittle fracture during the manufacturing and applicational processes which ultimately provides favorable planar and specular reflectance characteristics in the visible wavelength range.

28 Claims, 2 Drawing Sheets

BRIGHT METAL FLAKE

BACKGROUND OF THE INVENTION

1. The Field of the Invention

The present invention relates generally to metal flakes. More specifically the present invention relates to thin metal flakes useful as pigments.

2. The Relevant Technology

The prior art is replete with various applications utilizing metallic flakes or platelets (hereinafter collectively referred to as flakes) to improve the luster, sparkle, shine, and/or reflective properties of the application. Such applications are well known and include coating compositions, inks, extrusions, paints, electrostatic coatings, infrared interference pigments, glass, ceramics and cosmetics. In general, it is known that for the application to achieve the greatest specular reflectance across visible wavelengths (300–800 nm), the metallic flakes should individually lay as flat as possible. As a collection of numerous flakes, the greatest reflectance, and hence greatest brightness, occurs when the flakes are collectively planar oriented to expose the greatest amount of surface area of the metallic flakes to the incident light and reflect as much of that light as possible.

A major factor, however, affecting those reflectance characteristics is the size or dimensions of the flake as the flake is used in a particular application. For example, if the flakes are thick, a plurality of thick flakes combined together in an application are prevented from lying together in a generally flat or horizontal singular plane because adjacent flakes cannot easily overlap each other due to their thickness. As a result, many flakes are adversely caused to be oriented in a substantially vertical manner and the plurality of flakes are formed into a radically non-planar layer. Incident light then exposed upon the non-planar layer is subject to extreme scatter and diffraction. Thus, the favorable reflective properties of the application are diminished by thick flakes. To a lesser extent, thick flakes frequently cause other difficulties such as the clogging of automatic-spray paint guns during painting applications.

However, it is also well known that as the thicknesses of the flakes is reduced, the point is reached where the flakes become so flimsy (non-rigid, flaccid) that they begin to curl and/or wrinkle. This decreases favorable planarity and reflective properties because incident light exposed upon the flakes is subject to scatter and diffraction. Additionally, if the flakes are too thin when applied onto a surface during applicational use, the flakes will assume any microscopic defects in the contour of that surface. For example, if that contour is rough, the flakes will correspondingly be rough or non-planar. Again, disfavored planarity and reflective properties result because incident light exposed on the surface is subject to scatter and diffraction.

Some manufacturing processes form flakes from a singular, larger sheet or film of metal which is "fractured" by well known means into smaller, flake-sized particles. Two types of fracture may result, "ductile" or "brittle." Ductile fractures cause the metal to undergo substantial plastic deformation near the vicinity of fracture before fracture occurs. This deformation causes numerous malformed regions having disfavorable planar characteristics to appear. As before, these malformed regions, such as regions having curled or wrinkled metal, disadvantageously tend to scatter and diffuse incident light exposed thereupon. Brittle fractures, on the other hand, tend to cause little or no plastic deformation of the metal before the fracture occurs which enables the produced metal flake to maintain, as much as possible, the original planarity of the larger metal sheet. Consequently, brittle fracture is the desired manufacturing fracture means.

However, brittle fracture does not occur with most metals having high reflectivity. In fact, brittle fracture is only likely to occur with materials having a large compressive strength as compared to its corresponding tensile strength. This is because the internal bond strength distributed throughout a material is composed of tensile and compressive components. The tensile strength compensates for forces out of the plane of the material and the compressive strength is related to forces in the plane. Thus, similar compressive and tensile strengths will allow ductile deformations since the relative strength into and out of the plane is equivalent. In contrast, brittle deformation occurs when the compressive strength is greater than the tensile strength and the material strength is directed into the plane, not out of the plane. Consequently, a high compressive strength relative to tensile strength results in bond rupture and material cracking when a force is applied. Thus, aluminum, for example, which has a tensile strength of about 13–24 $lb/in^2$ and a compressive strength of about 13–24 $lb/in^2$, would most likely undergo a ductile fracture under a uniaxial stress which would cause the aluminum to exhibit disfavored reflective characteristics. Moreover, once the aluminum is bent or deformed, as would occur with ductile fracture, the aluminum remains deformed and the disfavored reflective characteristics would persist. Consequently, it is difficult to manufacture metal flakes, such as aluminum, without malformations that reduce reflectance.

As is well known, fracture mechanics are not only important for metal flakes during the manufacturing process, but are as equally important during use. For example, applicational processes, such as the drying of a paint or ink solvent, also induce stresses on the flake. These stresses, caused by surface tension, again cause the flake to undergo fracture or malformation. Since brittle fracture of the flake during the applicational process also tends to produce smaller flakes that maintain much of the original planarity of the larger flake, instead of curled or deformed flakes, flake planarity and reflective properties are improved. Thus, flake brittleness is a characteristic not only preferred during the manufacture process but also preferred during the applicational use. Accordingly, the prior art has attempted to produce thin, rigid and brittle flakes facilitating both the manufacturing thereof and the reflective properties of the application.

Yet all prior solutions have involved compromises. For example, in U.S. Pat. No. 5,198,042, entitled "Aluminum Alloy Powders for Coating Materials and Materials Containing the Alloy Powders," it is taught to alloy the metal flake with other materials and metals to reduce the adverse curling, wrinkling and malleability of thin flakes. Alloying, however, dilutes the reflectance properties of the flake.

In U.S. Pat. No. 4,213,886, entitled "Treatment of Aluminum Flake to Improve Appearance of coating Compositions," a surface bound species that pulls the flake flat in a coating resin. This method, however, requires chemical tailoring of the flake and the resin in order achieve chemical compatibility with the species. Such compatibility is difficult and has not proved to be practical.

In U.S. Pat. No. 4,629,512, entitled "Leafing Aluminum Pigments of Improved Quality," flakes are floated on a resin coating. Adversely, this method submits the flake to durability attacks because the flake is unprotected. Such attacks primarily include corrosion which not only corrodes the flake but tends to give the application a mottled or discolored appearance. Additionally, if this method were used in conjunction with another resinous application, such as a clear overcoat paint, the overcoat itself would tend to disfavorably disrupt the planar orientation of the flake because of solvent penetration. Again, reflectance properties are decreased.

In U.S. Pat. No. 5,593,773, entitled "Metal Powder Pigment," pre-cracked flakes are disclosed having such a small aspect ratio that malformation of the flake is essentially impossible. A shrinking aspect ratio, however, also correspondingly shrinks the inherent reflectance capability of the flake. This is because, as the aspect ratio becomes smaller, any non-planar flake orientation during applicational use exposes such a small surface area of the flake to the incident light that reflection of that light is minimal. Other prior art proposals, such as encapsulating a metal flake in a metallic coating, also decrease the flake aspect ratio which adversely eliminates the ability of the flake to reflect incident light.

In U.S. Pat. No. 3,622,473, entitled "Method of Providing Aluminum Surfaces with Coatings," flake rigidity is increased by oxidizing the reflector of the flake to form a rigid, outer oxide layer. Whenever an oxide is used, however, the inherent reflectance properties of the flake are decreased. Additionally, oxides are typically formed at defect sites on the flakes which then tends to prevent a uniform application across the surface of the flake. This non-uniformity introduces a reduction in reflectance and can also cause a mottled applicational appearance.

In U.S. Pat. Nos. 3,988,494 and 4,978,394 attempts have been made to improve flake rigidity by applying singular or multiple layer coatings about the surfaces thereof. Thus far, the singular layer coatings have been so thick that reflective properties are detrimentally damaged because the coatings have greatly contributed to the scatter of light. The multiple layer coatings have induced even more scatter and adversely caused light to diffuse at the boundaries between various layers. In addition, all coatings thus far have essentially been organic and inherent within the crystalline structure of these organic coatings is a natural limitation as to how thinly applied the coatings can be manufactured and still provide structural rigidity to a flimsily thin metal flake. Disadvantageously, the natural thickness limitation is still so large that other applicational processes remain burdened by this thickness. Such processes include spraying the flakes through an automatic-spray paint gun. Moreover, organic coatings when applicationally used in a solvent are eventually caused to lose structural rigidity because of dissolution related effects.

Although some reflective coatings exist that are rigid and facilitate brittle fracture, the coatings are unlike most of the other prior art because they do not even use a metal flake. In U.S. Pat. No. 4,309,075, entitled "Multilayer Mirror with Maximum Reflectance," for example, multiple layer coatings are taught that merely simulate a metal flake and its reflective properties. The coatings, known as "high-low" coatings after their alternatingly layers of high-low indices of refraction, are used to create a reflector that simulates the reflective properties of a metal flake. Another example is described in U.S. Pat. No. 3,123,490 issued to Balomey wherein a layer of ZnS coated on a top and bottom thereof with $MgF_2$. Although rigid and subject to brittle fracture, this structure is typically very thick (about 215 microns) and cannot be used in many applications requiring thin flakes. Moreover, it is often necessary to have numerous layers of alternating high-low coatings to achieve simulation of the metal flake. But as thicknesses and layers increase, manufacturing complexities and economic burdens correspondingly increase.

Accordingly, it is desirous to find alternatives for inexpensively producing a thin, rigid and brittle metal flake to provide favorable reflective characteristics to various other applications.

SUMMARY AND OBJECTS OF THE INVENTION

It is, therefore, an object of the present invention to provide a substantially rigid thin metal flake having good specular reflectance characteristics in the wavelength range of about 300 to about 800 nm.

It is a further object of the present invention to provide a thin metal flake having brittle fracture properties thereby affording improved reflectance characteristics during applicational use.

It is yet another object of the present invention to provide very thin metal flakes having substantial rigidity and brittleness.

It is still another object of the present invention to provide a relatively cost-effective process of producing a thin, rigid and brittle metal flake.

It is still yet another object of the present invention to provide a thin, rigid and brittle metal flake having a large aspect ratio.

In accordance with the invention as embodied and broadly described herein, the foregoing and other objectives are achieved by preparing a sheet comprising a thin metal layer having dielectric coatings disposed on the surfaces thereof. This structure has the favorable properties of being both brittle and rigid so that it is easily fractured into small bright metal flakes during the manufacturing processes without the flakes becoming curled or wrinkled. The flakes so-formed have been observed as having a large aspect ratio capable of favorably reflecting substantial amounts of incident light during applicational use.

In a preferred embodiment, the metal layer is aluminum having a thickness of about 100 nm. Each side of the aluminum is preferably coated with an inorganic dielectric, such as silicon dioxide or magnesium fluoride, each having a thickness of about 100 nm. The result is a very thin three-layered metal flake about 300 nm thick that exhibits a uniaxial compressive strength of about 8 times its uniaxial tensile strength. As a result, the metal flake is then afforded the benefits of brittle fracture and rigidity during the manufacturing and applicational processes which ultimately provides favorable planar and reflective characteristics for both the flake and the applicational use.

These and other objects and features of the present invention will become more fully apparent from the following description and appended claims, or may be learned by the practice of the invention as set forth hereinafter.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are not therefore to be considered to be limiting of its scope, the invention in its presently understood best mode for making and using the same will be described and explained with additional specificity and detail through the use of the accompanying drawings in which.

DETAILED DESCRIPTION OF THE PREFERRED EMBODIMENTS

The present invention is directed to thin flakes having improved specular reflectance characteristics in the wavelength range of about 300 to about 800 nm suitable for use as pigments in various applications. It is a feature of the present invention to support a thin reflector layer, typically metal, with dielectric coatings disposed on the two opposing planar surfaces thereof. The dielectric layers provide rigid support and brittle fracture characteristics for the metal layer. The uses are well known and include, but are not limited to, coating compositions, inks, extrusions, paints, electrostatic coatings, infrared interference pigments, glass, ceramics and cosmetics.

Figure 1:
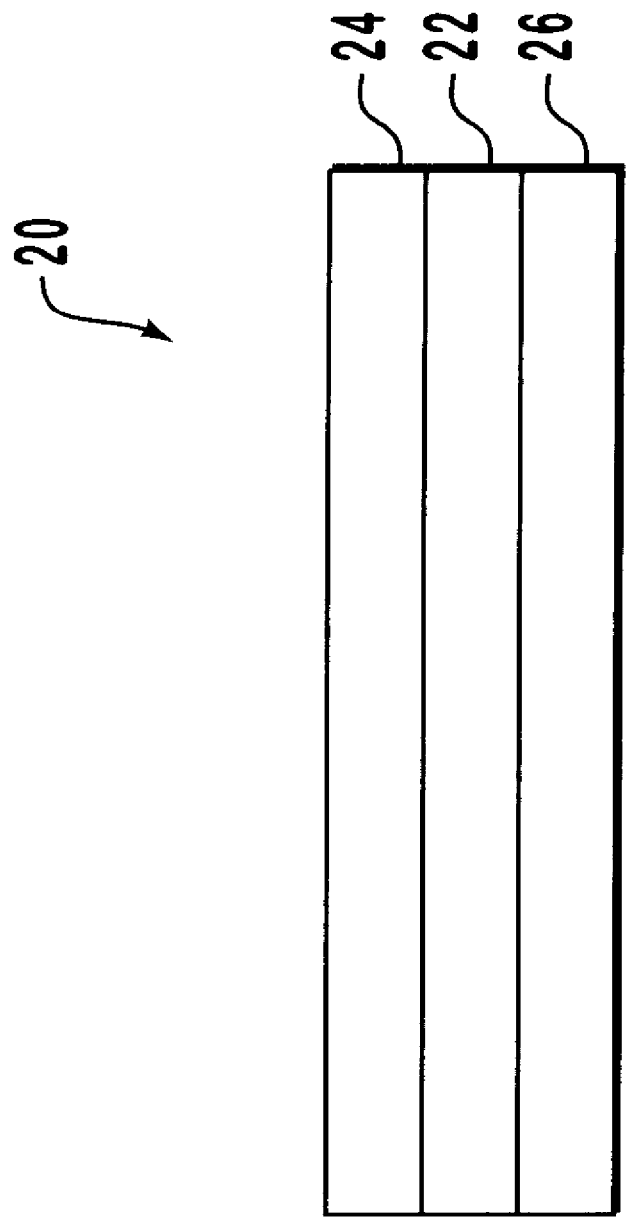
FIG. 1 is a cross section view of a bright metal flake in accordance with the present invention.

A preferred embodiment of a flake in accordance with the present invention is depicted schematically in FIG. 1. Flake 20 is shown as being a three-layered structure having an inner reflector layer 22 and two outer dielectric layers 24 and 26. Although not illustrated, it should be understood that other layers could be included as long as the functionality of the structure of FIG. 1 remains.

The materials of reflector layer 22 is selected so as to have reflective characteristics suitable for the intended use of the flake. The presently preferred reflector material is aluminum because aluminum has good reflectance characteristics while remaining inexpensive and easy to form into a thin layer. It will be appreciated in view of the teachings herein, however, that other reflective materials may be used in place of aluminum. For example, silver, gold, platinum and palladium, or alloys of these or other metals might be used in place of aluminum. Other useful materials include, but are not limited to, metal carbides, oxides, nitrides and sulfides, or mixtures of metals and one or more of these materials. For purposes of convenience and brevity, the flake of the present invention shall sometimes be referred as a "bright metal flake." This term is not meant to exclude reflector layers formed of a material other than a pure metal.

Situated on the opposing surfaces of reflector layer 22 are two dielectric layers 24 and 26. The presently preferred dielectrics are inorganic, because inorganic dielectric materials have been found to have good characteristics of brittleness and rigidity. Most preferred are dielectric layers of either silicon dioxide ($SiO_2$) or magnesium fluoride ($MgF_2$) because these materials are readily available and easily applied. It will be appreciated from the teachings herein, however, that any dielectric providing the functionality described would be an acceptable substitute for one of these materials. Such acceptable substitutes include, but are not limited to, $Al_2O_3$, $TiO_2$, ZnS or any dielectrics having an index of refraction below about 1.65. Advantageously, these materials will also protect against the adverse affects of solvents during applicational use thereof.

The thickness of an aluminum reflector layer is in a preferred range of about 40–150 nm with the limits of 40 and 150 nm being merely representative and not restrictive. For example, the lower limit of 40 nm is selected so that the aluminum layer is other than a transparent layer. Other reflector materials may justify higher or lower minimum thicknesses in order to obtain a non-transparent thickness. The upper limit of 150 nm, in this embodiment, is selected primarily to obtain a high aspect ratio in the final flake. Even greater thicknesses could be sustained for some purposes.

In a more preferred range, the thickness of an aluminum reflector layer is from about 80 to about 150 nm with a most preferred thickness of about 100 nm. With respect to the lower limit, 80 nm is selected to obtain a substantially opaque thickness of aluminum for the purposes of facilitating reflectance. Other reflector materials may justify higher or lower minimum thicknesses in order to obtain opaque thicknesses. The upper limit of 150 nm in is still selected to maintain a high aspect ratio in the final flake. It is contemplated that the reflector thickness selected, however, will be flimsy if unsupported, having adverse properties such as curling, wrinkling and malleability of the layer.

The preferred thickness of each of the dielectric layers is between about 50–200 nm, with a most preferred thickness of about 100 nm. Similar to the thickness of the metal layer, the preferred range of coating thicknesses is subject to variation based upon the actual metal layer and the dielectric coating chosen. With an aluminum layer and either silicon dioxide or magnesium fluoride, the lower thickness limit of about 50 nm is selected based upon the strength of the coating beyond which, when smaller, will not be strong enough to maintain structural integrity, hence flake rigidity, under the stress and strain imposed by a flexing aluminum layer. The upper limit of about 200 nm is selected based upon the observation that color interference between dielectric layers commences at thicknesses beyond 200 nm. In situations where color interference is useful, thicker dielectric layers may be used.

From the foregoing, it will be appreciated that the presently preferred flake in accordance with the present invention is only about 300 nm thick: 100 nm for each of the two dielectric layers and another 100 nm for the reflector layer. Despite this exceedingly small flake thickness, it has been surprisingly discovered that a flake having this three-layered structure has sufficient rigidity for use as a highly reflective pigment, primarily because of the inherent uniaxial strengths of the dielectrics. For example, a dielectric coating of silicon dioxide, which has a uniaxial compressive strength of about 160,000 ($lb/in^2$) and a uniaxial tensile strength of about 7000 ($lb/in^2$), prevents the internal reflector layer from flexing, bowing or otherwise deforming.

Aluminum has a tensile strength approximately equal to its compressive strength. Yet when the aluminum layer of the present invention is layered with the dielectrics of the present invention, the uniaxial compressive strength ($lb/in^2$) of the flake is surprisingly about 8 times greater than the uniaxial tensile strength ($lb/in^2$). This surprising result is empirically supported under the well known theory of brittle fracture known as Griffith's theory. For a further discussion of Griffith's theory, see e.g., William D. Callister, Jr., *Materials Science and Engineering* (John Wiley & Sons, Inc., 2d ed., 1991). This substantial difference in strengths beneficially transforms an aluminum layer tending to fracture by ductility into a layer tending to fracture by brittleness. Brittle fracture characteristics then advantageously serve to facilitate the separation of a plurality of metal flakes from a larger metal film during the manufacturing processes and to facilitate the fracture of individual metal flakes as stresses are imposed during applicational use.

In a preferred brittleness range, the metal layer is satisfactorily strengthened by the dielectric coatings when the uniaxial compressive strength of the metal flake is about 6 times or higher than the uniaxial tensile strength. Although the metal flake can be strengthened in amounts less than about 6, the metal flake then tends to exhibit adverse fracture characteristics similar to those of ductile fractures. It should be appreciated that although the foregoing rigidity and brittleness was achieved in a two-sided coating, it is even contemplated that the layer can also be coated upon a singular side of the reflector and still achieve favorable properties during manufacturing and use. The singular layer coating, however, must be stress balanced by means well known to those skilled in the art to prevent curling of the flake. The two sided coating, however, is the preferred embodiment to satisfactorily improve flake rigidity and to facilitate protection against detrimental attacks, such as corrosion, upon the metal layer. Corrosion is even contemplated within the scope of this invention as being more substantially fended off by further providing an encapsulating material about any exposed regions of the metal flake or the entire three-layered structure itself. Such encapsulating materials are well known in the art and are not described herein in detail.

The flakes of the present invention are not of a uniform shape. Nevertheless, for purposes of brevity, the flakes will be referred to as having a "diameter." It is presently preferred that the diameter of the flakes be in a preferred range of about 1–50 microns with a more preferred range of about 5–25 microns. Thus, the aspect ratio of the flakes of the present invention is in a preferred range of about 6.5–625 with a more preferred range of about 50–250. As is well known, the greater the aspect ratio, the flatter the flakes will lie, hence increasing reflectance. Thus, since many prior art flakes have an optimal aspect ratio of only about 15, it should be apparent that the aspect ratio of the present invention will inherently yield substantially improved reflectance properties.

In general, the presently preferred process for manufacture of the metal flakes involves the providing of a flexible web onto which one of the outer dielectric layers is deposited, followed by deposition of the reflector layer and the remaining dielectric layer.

Since the deposition of the dielectric layers is preferably accomplished by vapor deposition means, it is observed that the dielectric layer will crack under the stresses imposed as the dielectric transitions from the vapor into the solid phase. Next, the reflector layer is deposited, taking on the characteristics of the underlying cracked dielectric layer. Finally, the other outer dielectric layer is deposited on the metal film. In this manner, the two dielectric layers bolster an extremely flimsy and thin metal film into a rigid metal film possessing characteristics tending to fracture the metal along the cracks of the dielectric layer in a brittle, instead of ductile manner. Thereafter, as the flexible web is removed, either by dissolution in a preselected liquid or by means of release agents, both well known in the art, a plurality of metal flakes are fractured out according to the cracks of the dielectric layer. This type of manufacturing technique is similar to that more fully described in U.S. Pat. No. 5,135,812, issued on Aug. 4, 1992 to Phillips et al., entitled "Optically Variable Thin Film Flake and Collection of the Same," expressly incorporated herein by reference.

Once manufactured, however, each individual metal flake possesses exceptional planar characteristics which allow each flake to be extremely flat even in the vicinity of the fracture. In applicational use with plurality of similar metal flakes, not only can the flakes advantageously overlap and lie in a substantially planar orientation but each individual metal flake still possesses characteristics tending to fracture the flake by brittleness. Thus, when an application in which the flakes are used imposes additional stresses upon the flake, such as paint drying, the flake will fracture due to brittle fracture characteristics rather than bend due to ductile fracture characteristics. Such rigidity and fracture characteristics of a metal flake are heretofore unknown.

EXAMPLE 1

Several samples of applicational pigments were prepared, each sample containing a plurality of bright metal flakes in accordance with the present invention. The metal layers each had a thickness of about 100 nm of aluminum and ranged in diameter from about 1 to about 50 microns. Layered upon the opposing planar surfaces of the metal layer was an inorganic dielectric coating having a thickness in a range of about 100 to about 200 nm. The inorganic dielectric coatings were selected as either silicon dioxide or magnesium fluoride.

Figure 2:
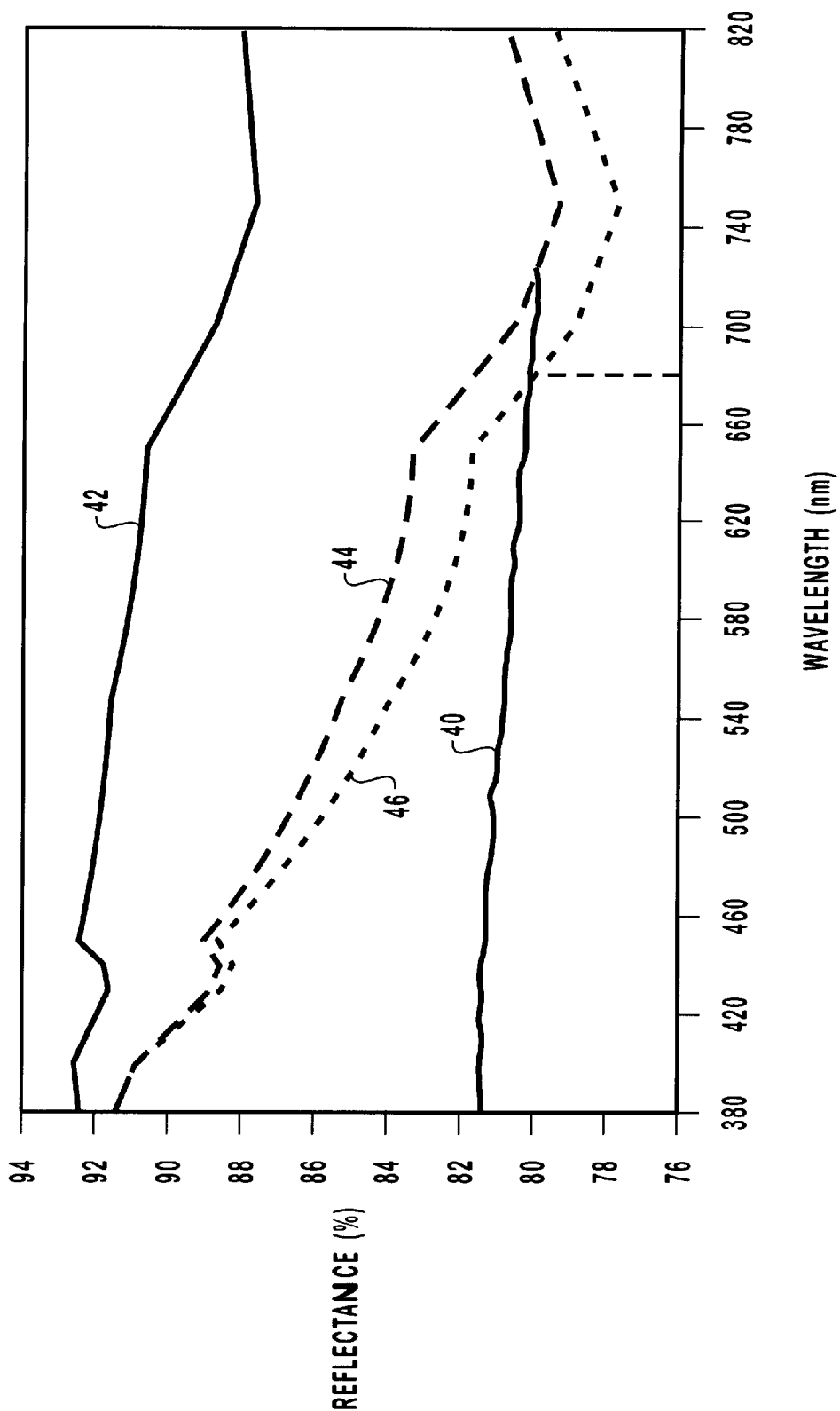
FIG. 2 is a graphic representation of the total reflectance of an aluminum pigment prepared with a plurality of bright metal flakes of the present invention.

With reference to FIG. 2, the actual reflectance results obtained as a function of various wavelengths were observed and recorded as reflectance curve 40. The reflectance curve has also been empirically supported by the results obtained from various other measurement devices (not shown) such as ink drawdowns, paint sprayouts and microscopy.

Super-imposed with the reflectance curve 40 on the reflectance-wavelength graph in FIG. 2 is the actual reflectance curve for a pure aluminum flake 42 and the predicted reflectance curves of an aluminum flake coated with either magnesium fluoride 44 or silicon dioxide 46. The predicted curves are modeled upon the reflectance of aluminum as a function of various wavelengths for a singular aluminum flake, vice a plurality of flakes. What should be appreciated is that although the actual observed results, reflectance curve 40, are below the predicted reflectance values below wavelengths of about 680 nm, the actual observed reflectance is above the predicted reflectance response for silicon dioxide above about 680 nm. While it might appear that the theoretical or predicted responses have been incorrectly modeled, it has been surprisingly discovered that the better-than-modeled reflectance response is a twofold advantageous result of the bright metal flakes of the present invention. Not only are the bright metal flakes of the present invention so rigid to exhibit favorable planar characteristics individually, but the bright metal flakes, as a plurality of flakes, are so thin that the flakes are believed capable of overlapping each other and still lie collectively in a substantially singular plane. This planar orientation is believed to provide for an enlarged surface area being exposed to incident light which enables a larger reflectance to be exhibited therefrom. The plurality of metal flakes are surprisingly allowed to overlap without radically changing the planar structure of the individual flakes which is quite unlike the flakes of the prior art.

It should also be appreciated from FIG. 2 that the measured reflectance results for all known prior art aluminum based pigments fall below 75%. Thus, the bright metal flakes of the present invention achieve, at a minimum, a 5% improvement in total reflectance and a 10% improvement in specular reflectance over the prior art. Not only are these results significantly better than the prior art but these rigid metal flakes have achieved results better than what has heretofore ever been predicted.

The present invention may be embodied in still other specific forms without departing from its spirit or essential characteristics. The described embodiments are to be considered in all respects only as illustrative and not restrictive. The scope of the invention is, therefore, indicated by the appended claims rather than by the foregoing description.

All changes which come within the meaning and range of equivalency of the claims are to be embraced within their scope.

What is claimed is:

1. A flake having substantial rigidity so as to provide high reflectance during use as a pigment, said flake comprising:
a reflector layer having a top surface, a bottom surface, and at least one side surface, and having a thickness in a range of about 40 nm to about 150 nm; and
a dielectric layer on each of the top and bottom surfaces but not on the at least one side surface, each dielectric layer having a thickness in a range of about 50 nm to about 200 nm the thickness chosen so that the dielectric layers do not substantially affect the color properties of the reflector layer.

2. A flake as defined in claim 1, wherein said dielectric layers are formed of an inorganic material and the reflector layer includes a metal.

3. A flake as defined in claim 1, wherein said reflector layer has an aspect ratio greater than 6.5.

4. A flake as defined in claim 1, wherein said reflector layer is formed of aluminum, silver, gold, platinum, palladium, or a mixture thereof.

5. A flake as defined in claim 1, wherein said dielectric layers are formed of a dielectric material having an index of refraction below about 1.65.

6. A flake as defined in claim 1, wherein said dielectric layers are formed of magnesium fluoride, silicon dioxide, alumina or titanium dioxide.

7. A flake as defined in claim 4, wherein the thickness of said reflector layer is about 100 nm.

8. A flake as defined in claim 1, wherein said thickness of each said dielectric layer is about 100 nm.

9. A flake as defined in claim 4, further comprising an encapsulant substantially formed over any exposed regions of said reflector layer.

10. A flake as defined in claim 1, which has a uniaxial compressive strength of at least 6 times a uniaxial tensile strength of said flake.

11. A thin metal flake, comprising:
an aluminum layer having a top surface, a bottom surface, and at least one side surface, and having a thickness of about 100 nm; and
an inorganic dielectric layer disposed on each of the top and bottom surfaces but not on the at least one side surface of said aluminum layer, each of the dielectric layers having a thickness of about 100 nm;
wherein a compressive strength of said flake is about 8 times greater than a tensile strength thereof in order to facilitate brittle fracture thereof.

12. A thin metal flake according to claim 11, wherein the flake has an aspect ratio in a range of about 6.25 to about 625.

13. A thin metal flake according to claim 11, wherein the flake has an aspect ratio in a range of about 50 to about 250.

14. A thin metal flake according to claim 11, wherein the inorganic dielectric layers are composed of a material having an index of refraction below about 1.65.

15. A thin metal flake according to claim 11, wherein the inorganic dielectric layers are composed of a material selected from the group consisting of magnesium fluoride, silicon dioxide, and alumina.

16. A thin metal flake according to claim 11, further comprising an encapsulant substantially about any exposed regions of said aluminum layer for facilitating protection of said aluminum layer from corrosion.

17. A thin film having a uniaxial compressive strength and a uniaxial tensile strength for manufacturing a plurality of thin metal flakes, comprising:
a reflector layer having a top surface, a bottom surface, and at least one side surface, and having a thickness in a range of about 40 nm to about 150 nm; and
a dielectric layer on each of the top and bottom surfaces but not on the at least one side surface to cause said uniaxial compressive strength to be at least about 6 times greater than said uniaxial tensile strength, each of the dielectric layers having a thickness in a range of about 50 nm to about 200 mn.

18. A thin film according to claim 17, wherein said reflector layer is one of aluminum, silver, gold, platinum, palladium, or a mixture thereof.

19. A thin film according to claim 17, wherein said reflector layer is one of a metal carbide, a metal oxide, a metal nitride, or a metal sulfide.

20. A thin film according to claim 17, wherein said dielectric layers are composed of a material having an index of refraction below about 1.65.

21. A thin film according to claim 17, wherein said dielectric layers are composed of one of magnesium fluoride, silicon dioxide, alumina, or titanium dioxide.

22. A thin film according to claim 17, wherein the thickness of said reflector layer is about 100 nm.

23. A thin film according to claim 17, wherein the thickness of each dielectric layer is about 100 nm.

24. A thin film according to claim 17, wherein said uniaxial compression strength is about 8 times said uniaxial tensile strength.

25. A reflective flake comprising:
a reflector layer having a top surface, a bottom surface, and at least one side surface, and having a thickness of about 40 nm to about 150 nm; and
a dielectric layer on each of the top and bottom surfaces but not on the at least one side surface, each of the dielectric layers composed of a material having an index of refraction below about 1.65 and being sufficiently thin so as not to substantially affect the color properties of the reflector layer.

26. The reflective flake of claim 25, wherein the reflector layer is composed of a metal selected form the group consisting of aluminum, silver, gold, platinum, palladium, and mixtures or alloys thereof.

27. The reflective flake of claim 25, wherein the dielectric layers are composed of a material selected from the group consisting of magnesium fluoride, silicon dioxide, and alumina.

28. The reflective flake of claim 25, wherein the dielectric layers have a thickness of at least about 50 nm and up to a thickness above which color interference effects are observable.

* * * * *